(12) United States Patent
Co et al.

(10) Patent No.: US 8,751,353 B2
(45) Date of Patent: *Jun. 10, 2014

(54) BREAKOUT INDEXES

(75) Inventors: Richard Co, Chicago, IL (US); Steve Youngren, Elgin, IL (US); Lori Aldinger, Naperville, IL (US); John Labuszewski, Westmont, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 189 days.

This patent is subject to a terminal disclaimer.

(21) Appl. No.: 12/909,658

(22) Filed: Oct. 21, 2010

(65) Prior Publication Data

US 2012/0101958 A1    Apr. 26, 2012

(51) Int. Cl.
*G06Q 40/00* (2012.01)

(52) U.S. Cl.
USPC .............................. 705/36 R; 705/35; 705/37

(58) Field of Classification Search
USPC ....................................................... 705/35–37
See application file for complete search history.

(56) References Cited

U.S. PATENT DOCUMENTS

| | | | |
|---|---|---|---|
| 6,944,595 B1 * | 9/2005 | Graser et al. ..................... 705/39 |
| 7,558,751 B2 * | 7/2009 | Sauter et al. ................. 705/36 R |
| 7,983,978 B2 * | 7/2011 | Brusso et al. .................... 705/37 |
| 8,239,306 B2 * | 8/2012 | Sauter et al. ................. 705/36 R |
| 8,407,126 B2 * | 3/2013 | Youngren et al. ............ 705/36 R |
| 8,510,186 B2 * | 8/2013 | Morgenstern et al. .......... 705/30 |
| 2004/0098334 A1 * | 5/2004 | Brusso et al. .................... 705/37 |
| 2004/0181477 A1 * | 9/2004 | Sauter et al. ..................... 705/36 |
| 2005/0216407 A1 * | 9/2005 | Feldman et al. ................. 705/42 |
| 2006/0265302 A1 * | 11/2006 | Schmalenberger et al. .... 705/35 |
| 2007/0027787 A1 * | 2/2007 | Tripp .............................. 705/36 |
| 2007/0174165 A1 * | 7/2007 | Brummette et al. ............. 705/35 |
| 2007/0174181 A1 * | 7/2007 | Brummette et al. ............. 705/37 |
| 2007/0198389 A1 * | 8/2007 | Orloske et al. ............. 705/36 R |
| 2008/0290181 A1 * | 11/2008 | Dimitri et al. ............. 235/61 PD |
| 2009/0076976 A1 * | 3/2009 | Yan et al. .................... 705/36 R |
| 2009/0125452 A1 * | 5/2009 | Kratka ........................ 705/36 R |
| 2011/0060674 A1 * | 3/2011 | King .............................. 705/37 |
| 2011/0119168 A1 * | 5/2011 | Carr et al. ....................... 705/35 |
| 2012/0101957 A1 * | 4/2012 | Youngren et al. ........... 705/36 R |
| 2012/0109846 A1 * | 5/2012 | Leven et al. ................ 705/36 R |
| 2012/0150765 A1 * | 6/2012 | Leven ......................... 705/36 R |
| 2012/0271747 A1 * | 10/2012 | Krause ............................ 705/37 |
| 2013/0218809 A1 * | 8/2013 | Youngren et al. ........... 705/36 R |
| 2013/0317972 A1 * | 11/2013 | Morgenstern et al. .......... 705/37 |

OTHER PUBLICATIONS

Prof. Werner Antweiler, The Euro, Europe's New Currency, An Information Page of the Pacific Exchange Rate Service, Dec. 7, 2001.*

* cited by examiner

*Primary Examiner* — Narayanswamy Subramanian
(74) *Attorney, Agent, or Firm* — Banner & Witcoff, Ltd.

(57) ABSTRACT

Methods and systems for calculating values for indexes based on breakout currencies are provided. A prospective breakout index may be formed before an entity breaks out of a monetary union. Other aspects relate to calculating an initial index value on a breakout date. An initial exchange rate of the breakout currency may be combined with a breakout value and/or a base value. In one embodiment, the breakout value is the reciprocal of the initial exchange rate. Therefore, in accordance with certain embodiments, the initial index value of the breakout index may be equal to the base value. Further aspects relate to calculating a second index value. A second exchange rate of the breakout currency may be utilized with the fixed base value and the breakout value to calculate the second index value of the breakout index. Further aspects relate to creating a prospective currency unit for a monetary union.

16 Claims, 6 Drawing Sheets

| i | State | 2009 GDP (Bil USD) | Contingent Weighting ($W_i$) |
|---|---|---|---|
| 0 | Euro Union | $10,584.611 | 100% - Σ Splinter Weights |
| 1 | Austria | $323.100 | 3.05% or 0% |
| 2 | Belgium | $381.000 | 3.60% or 0% |
| 3 | Cyprus | $22.970 | 0.22% or 0% |
| 4 | Finland | $182.600 | 1.73% or 0% |
| 5 | France | $2,110.000 | 19.93% or 0% |
| 6 | Germany | $2,811.000 | 26.56% or 0% |
| 7 | Greece | $341.000 | 3.22% or 0% 514 |
| 8 | Ireland | $176.900 | 1.67% or 0% |
| 9 | Italy | $1,760.000 | 16.63% or 0% |
| 10 | Luxembourg | $38.370 | 0.36% or 0% |
| 11 | Malta | $9.831 | 0.09% or 0% |
| 12 | Netherlands | $654.900 | 6.19% or 0% |
| 13 | Portugal | $233.400 | 2.21% or 0% |
| 14 | Slovakia | $115.700 | 1.09% or 0% |
| 15 | Slovenia | $55.840 | 0.53% or 0% |
| 16 | Spain | $1,368.000 | 12.92% or 0% |

FIG. 5A

| I | State | $P_i$ | $W_i$ | $BV_i$ | Product |
|---|---|---|---|---|---|
| 0 | Euro Union | 1.3000 | 96.78% | 1.0000 | 1.2581 |
| 1 | Austria | - | 0% | - | 0 |
| 2 | Belgium | - | 0% | - | 0 |
| 3 | Cyprus | - | 0% | - | 0 |
| 4 | Finland | - | 0% | - | 0 |
| 5 | France | - | 0% | - | 0 |
| 6 | Germany | - | 0% | - | 0 |
| 7 | Greece | 0.5200 | 3.22% | 2.5000 | 0.0419 |
| 8 | Ireland | - | 0% | - | 0 |
| 9 | Italy | - | 0% | - | 0 |
| 10 | Luxembourg | - | 0% | - | 0 |
| 11 | Malta | - | 0% | - | 0 |
| 12 | Netherlands | - | 0% | - | 0 |
| 13 | Portugal | - | 0% | - | 0 |
| 14 | Slovakia | - | 0% | - | 0 |
| 15 | Slovenia | - | 0% | - | 0 |
| 16 | Spain | - | 0% | - | 0 |
| | | | | NECU = | 1.3000 |

FIG. 5B

| I | State | $P_i$ | $W_i$ | $BV_i$ | Product |
|---|---|---|---|---|---|
| 0 | Euro Union | 1.3500 | 96.78% | 1.0000 | 1.3065 |
| 1 | Austria | - | 0% | - | 0 |
| 2 | Belgium | - | 0% | - | 0 |
| 3 | Cyprus | - | 0% | - | 0 |
| 4 | Finland | - | 0% | - | 0 |
| 5 | France | - | 0% | - | 0 |
| 6 | Germany | - | 0% | - | 0 |
| 7 | Greece | 0.4400 | 3.22% | 2.5000 | 0.0354 |
| 8 | Ireland | - | 0% | - | 0 |
| 9 | Italy | - | 0% | - | 0 |
| 10 | Luxembourg | - | 0% | - | 0 |
| 11 | Malta | - | 0% | - | 0 |
| 12 | Netherlands | - | 0% | - | 0 |
| 13 | Portugal | - | 0% | - | 0 |
| 14 | Slovakia | - | 0% | - | 0 |
| 15 | Slovenia | - | 0% | - | 0 |
| 16 | Spain | - | 0% | - | 0 |
| | | | | NECU = | 1.3420 |

FIG. 5C

BREAKOUT INDEXES

FIELD OF THE INVENTION

The present invention relates to the calculation of indexes and, in particular, to methods and systems that may calculate values for indexes based on breakout currencies.

DESCRIPTION OF THE RELATED ART

In modern history, governmental entities have joined together to form monetary unions. The formation of monetary unions is intended to promote economic growth by minimizing or removing political barriers, facilitating travel and cross-border trade, providing for pricing transparency and a unified financial marketplace, price stability and/or low interest rates. As one example, the European Union has achieved many of these goals. Its currency (the Euro or EUR), has become the world's 2nd most preferred reserve currency after the U.S. Dollar (USD). While different in some aspects, currency unions may also provide benefits to its members. In this regard, reference to monetary unions throughout this disclosure shall encompass similar and/or related collections of entities, such as currency unions unless noted otherwise.

Although benefits exist to members of these unions, there may also be problems. For example, national governments of the European Union (inclusive of their central banks) can no longer control monetary supply and must generally meet certain "convergence criteria," however, may still issue debt—leading to potential consequences to the union. For example, some entities of a union may experience high unemployment, continued recessions or depressions, and deficit spending problems, thus altering the value of the currency. In contrast, other entities in the union may experience stronger economic conditions, thus triggering strong political and public sentiments. For example, should and must the entities with stronger economic conditions provide economic assistance to the other entities, and if so, to what extent can or should the monetary union manage a specific member's national affairs. These issues raise questions regarding the best approaches to preserve value of the monetary union's currency while best serving its members.

Because the currency of monetary unions, such as the European Union, are widely circulated, it is constantly exchanged with other currencies. Further, the Euro and other currencies are traded, like other commodities. Because of the problems discussed above, contracts to trade on the expectation of a possible breakout or dissolution have been made. Some traders have utilized so-called binary or political event contracts to trade on the expectation of a possible breakout or dissolution of a monetary union. For example, a binary contract is purchased or sold at a negotiated price and pays either $X or $0 depending and contingent upon the occurrence of a specific event, e.g., a specific entity breaks out of the monetary union. But that payout of $X is completely arbitrary and is not based on the observed economic consequences of such monetary dissolution.

Further, current systems or methods do not accurately provide a measure of the aggregate value of a monetary union currency (such as the Euro) as well as any newly established or re-established currencies from any possible breakout entities that splinter or otherwise change their relationship with the monetary union. For example, one or more entities may leave, be removed from, or otherwise alter their relationship in a substantial manner with a monetary union. In certain instances, the entities (referred to as a "breakout entities") may initiate circulating their own currency; therefore, the value of the currency of a monetary union that the entities may no longer be associated with will not reflect the economic conditions of the breakout entities. It may, however, be beneficial to value a prospective "breakout" currency relative to the ongoing value of the currency of the monetary union.

Therefore, for these and other reasons, improved systems and methods are desirable.

SUMMARY OF THE INVENTION

Aspects of the embodiments address one or more of the issues mentioned above and/or other issues by disclosing methods, computer readable media, and apparatuses configured to calculate threat ratings. Aspects of the invention relate to computer implemented methods.

Certain aspects relate to a breakout index. In one embodiment, the breakout index may be formed before an entity breaks out of a monetary union. In certain aspects, the index may incorporate a contingent or forward looking aspect, for example, to the extent that a value of the index will remain at a base value if an event does not occur. But if a specific event does occur or may occur with a certain degree of probability, the value of the index may reflect the economic impact of such event by reflecting the relative value of the newly or prospectively established "breakout" currency vs. the currency of the monetary union.

According to one aspect, it may be determined whether an entity, such as a governmental entity, of a monetary union issues a breakout currency. In one embodiment, if the breakout currency is not issued, a processor may calculate an initial index value of a breakout index based upon a prospective breakout currency. In one embodiment, the initial value may be determined by the equation: Breakout Index$_i$=Base Value×Exchange Rate$_i$×Breakout Value, wherein the initial value of the Breakout Index ("Breakout Index$_i$") equals the fixed base value ("Base Value") multiplied with the initial exchange rate ("Exchange Rate$_i$") and the breakout value determined as the reciprocal of the Exchange Rate, ("Breakout Value"). Therefore, the Breakout Index$_i$=Base Value.

Other aspects relate to calculating an initial index value upon issuance (or indication of issuance) of the first breakout currency by an entity of the monetary union. For example, an initial exchange rate of the first breakout currency may be received. The exchange rate may be a first exchange rate against the currency of the monetary union. Or, the exchange rate may be an official initial exchange rate of the breakout currency vs. the currency of the monetary union. Certain embodiments, may determine the breakout value of the first breakout currency. In one embodiment, the breakout value may be established as a reciprocal of the initial exchange rate. Therefore, in accordance with certain embodiments, the initial index value of the breakout index is equal to the base value. This may be useful to calibrate the index on the breakout date.

Further aspects relate to systems and methods configured to calculate a second index value of the breakout index. The second index value may be calculated on a routine basis and/or upon the occurrence of an event. In one embodiment, a second exchange rate of the first breakout currency measured against the currency of the monetary union may be received or calculated. The fixed base value and the breakout value (such as received or determined as part of calculating the initial index value) may be utilized with the second exchange rate of the first breakout financial instrument to calculate the second index value of the breakout index. In one embodiment, the second index value may be determined by the equation: Breakout Index$_2$=Base Value×Exchange Rate$_2$×

Breakout Value, wherein the second value of the Breakout Index ("Breakout Index$_2$") equals the fixed base value multiplied with the second exchange rate ("Exchange Rate$_2$") and the breakout value utilized in the determination of the initial value ("Breakout Value"). Those skilled in the art will appreciate that additional index values may be calculated. Further, additional indexes based upon other breakout currencies are within the scope of this disclosure.

Further aspects relate to the reception of bids and offers for a breakout financial instrument based upon the breakout index. In accordance with certain embodiments, the bids and offers may be received at an order book module of an exchange computer system. In another embodiment, the bids and offers may be matched at a match engine of an exchange computer system.

Further aspects relate to systems and methods configured to calculate a value representing a prospective currency unit of a monetary union. In one embodiment, an initial value of the prospective currency may be calculated on a breakout date of one or more breakout entities. The calculation of the initial value may include weighting an exchange rate of the breakout entity against a second currency (such as the US Dollar) according to its proportion of an aggregated economic indicator value for the monetary union. The exchange rate the monetary union's currency (such as the Euro) may also be weighted against the same second currency according to the proportion of the economic indicator value not attributable to the breakout entity (or entities). In one embodiment, the economic indicator may relate to the Gross Domestic Product (GDP) of the respective entities.

Certain embodiments may utilize the weighted exchange rates to obtain the initial value of the prospective currency unit. For example, in certain embodiments, an indication may be received indicating whether an entity issued a breakout currency. A null contingency weighting may be assigned to each entity that did not issue a breakout currency. For breakout entities, contingency weightings representative of the proportion of the entity's economic indicator value against the aggregated economic indicator may be assigned. In further embodiments, a breakout value that is a reciprocal of an initial exchange rate between the breakout currency and a currency of the monetary union may be assigned on the breakout date.

Products for each entity may be calculated with a processor using an initial price, the assigned contingency weighting, and the breakout value of the respective breakout currency. A product may be calculated for the monetary union with a processor using the price of the currency of the monetary union and a monetary union contingency weighting. In certain embodiments, the products may be summed with a processor to create an initial value representing a prospective currency unit of the monetary union. Further aspects relate to calculating a second value for the prospective currency unit after calculating the first value. The second (or additional values) may be calculated to accord proper weightings of updated economic indicator values, account for fluctuating exchange rates, factor in the addition or subtraction of any breakout entities, or any other variables.

Aspects of the embodiments may be provided in a computer-readable medium having computer-executable instructions, that when executed by a processor, are configured to perform one or more of the process steps described herein. These and other aspects of the embodiments are discussed in greater detail throughout this disclosure, including the accompanying drawings. The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein:

FIGS. 5A-5C are illustrative conceptual tables that may be utilized in the calculating prospective currency unit values in accordance with an embodiment of the invention.

DETAILED DESCRIPTION OF THE INVENTION

Exemplary Operating Environment

Figure 1:
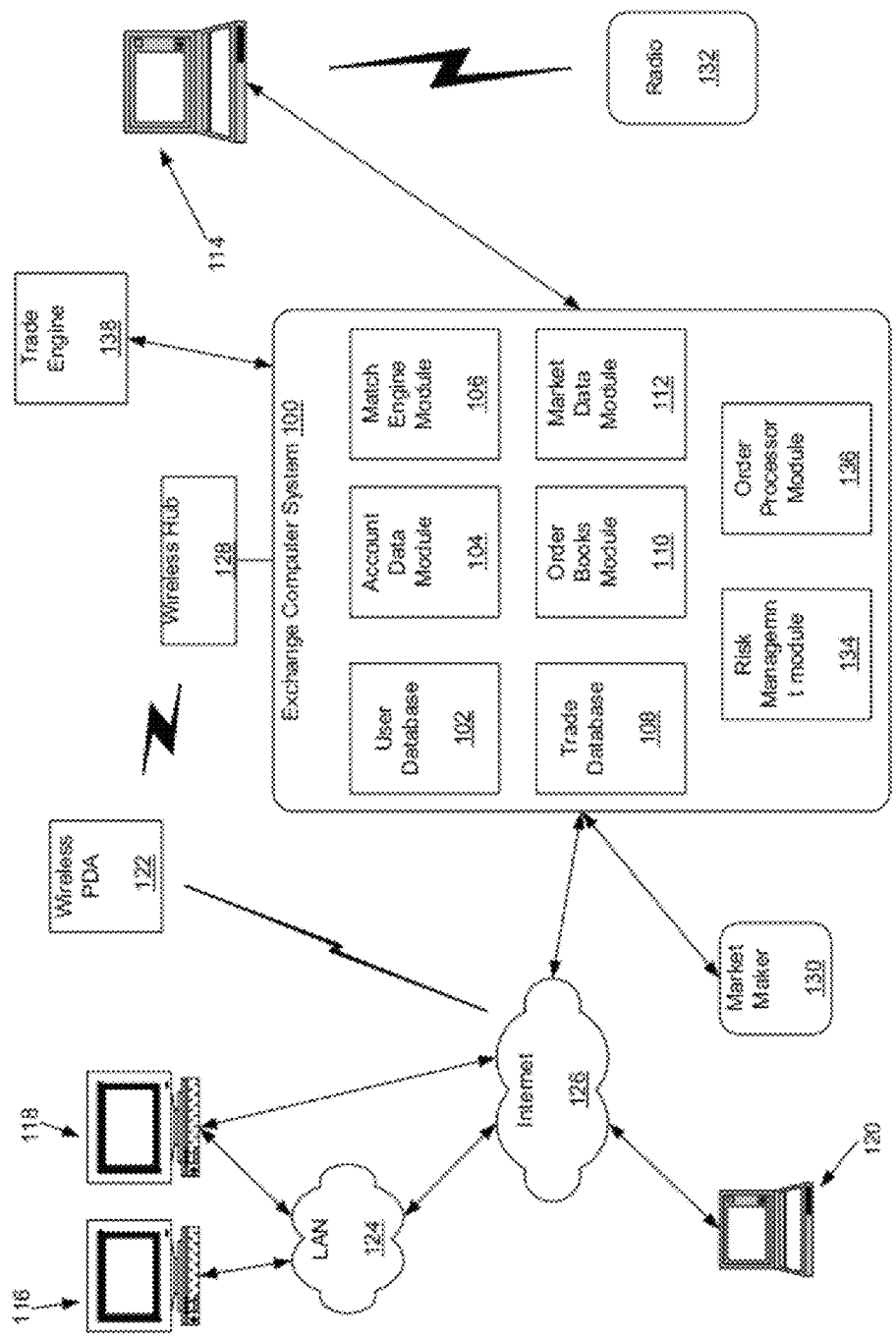
FIG. 1 illustrates a computer network system that may be used to implement aspects of the present invention.

Aspects of the present invention may be implemented with computer devices and computer networks that allow traders, exchanges and other entities to exchange trading data, such as orders and market information. An exemplary trading network environment for implementing trading systems and methods is shown in FIG. 1. An exchange computer system 100 receives orders and transmits market data related to orders and trades to users. Exchange computer system 100 may be implemented with one or more mainframe, desktop or other computers. In this regard, exchange computer system comprises at least one processor, such as processor 101, configured to process computer-executable instructions from at least one tangible non-transitory computer-readable medium. A user database 102 includes information identifying traders and other users of exchange computer system 100. Data may include user names and passwords potentially with other information to identify users uniquely or collectively. An account data module 104 may process account information that may be used during trades. A match engine module 106 is included to match bid and offer prices.

Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose variable defined derivative product and aggregate order types for processing by order book module 110 and match engine module 106.

The trading network environment shown in FIG. 1 includes computer devices 114, 116, 118, 120 and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a telecommunications line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems. Coupling can be direct as described or any other method described herein.

The operations of computer devices and systems shown in FIG. 1 may be controlled by computer-executable instructions stored on computer-readable media. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Exemplary Embodiments

Figure 2:
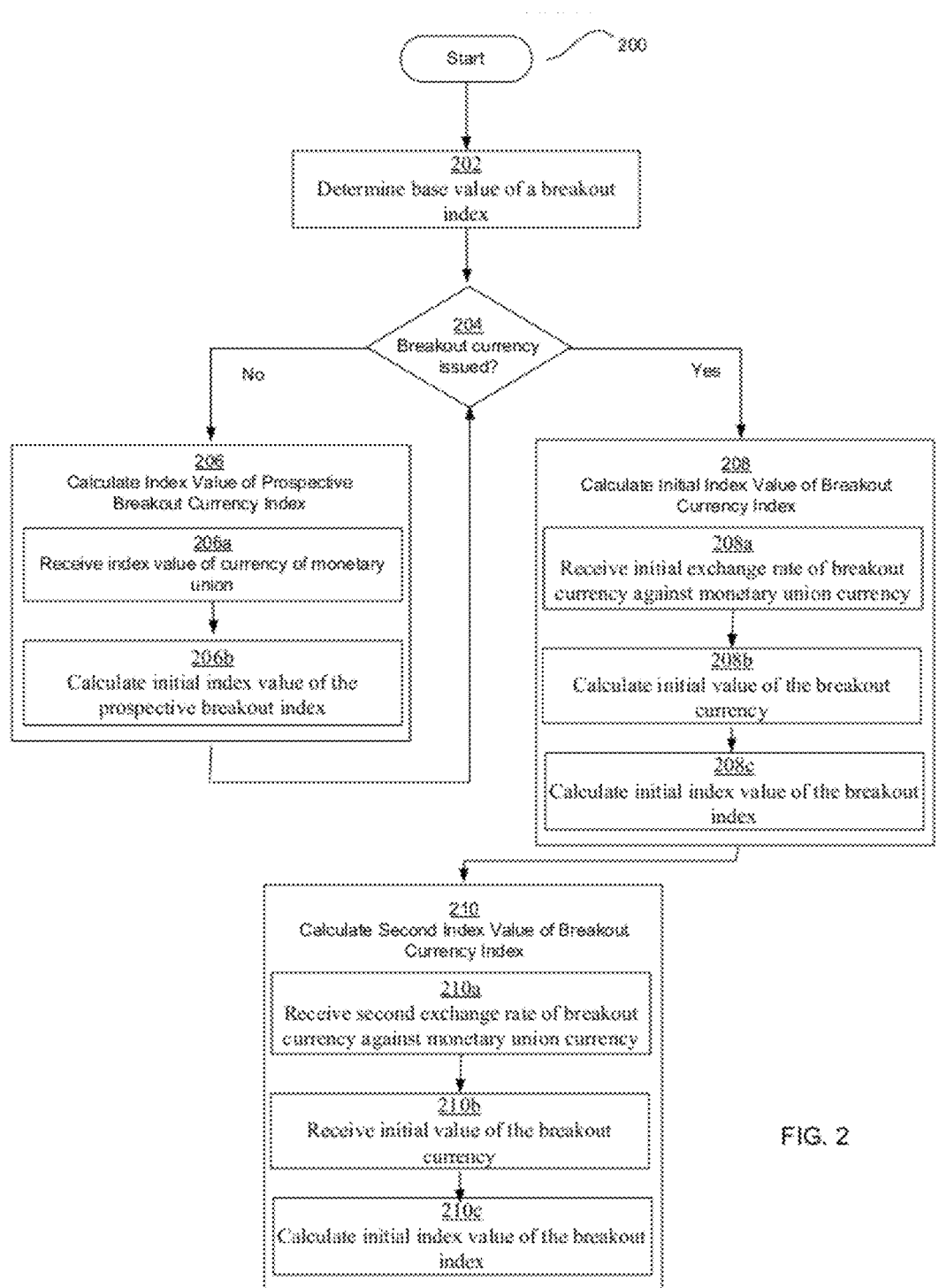
FIG. 2 is a flowchart showing an exemplary method of calculating index values of a breakout currency index in accordance with an embodiment of the invention.
Figure 3:
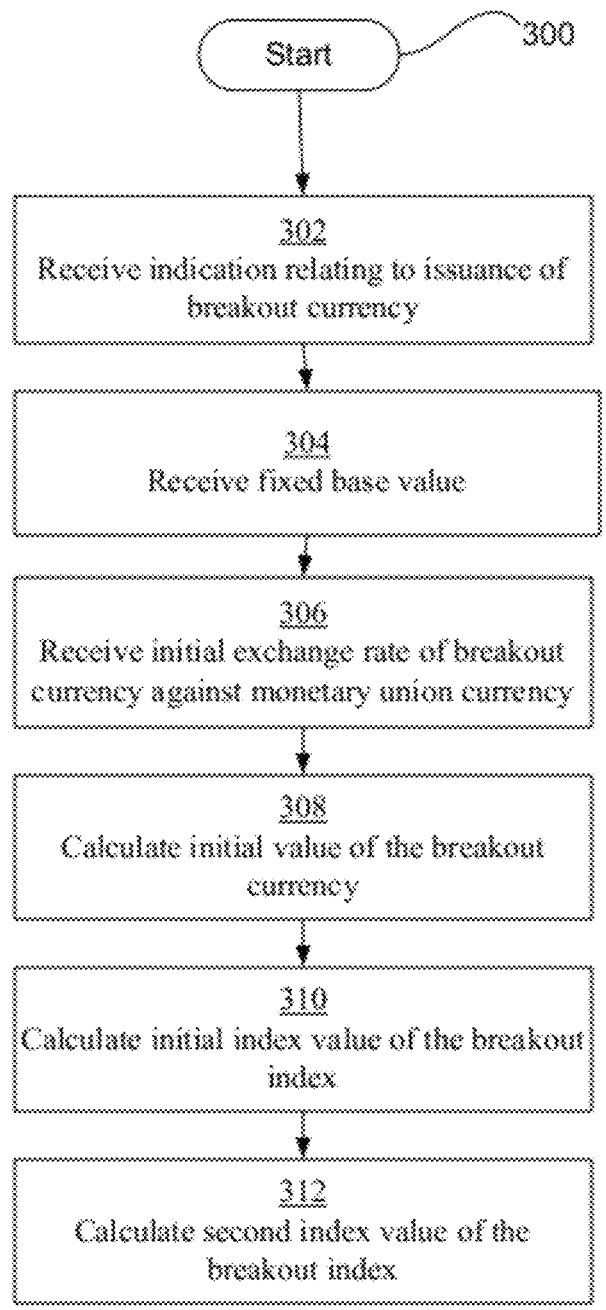
FIG. 3 is a flowchart showing another exemplary method of calculating an index value of a breakout currency index in accordance with an embodiment of the invention.

FIGS. 2-3 are flowcharts of various exemplary methods in accordance with aspects disclosed herein that may be implemented to calculate an index value of a breakout index. In certain embodiments, an initial index value may be calculated upon issuance of a breakout currency. In accordance with other embodiments, a prospective breakout index may be formed before issuance of a respective breakout currency, therefore, a prospective breakout index value may be calculated although no breakout currency has been issued, or may be issued. Exemplary embodiments will be described in more detail below.

Looking first to FIG. 2, flowchart 200 displays an exemplary method of calculating an initial index value of a breakout index. A breakout index may be created by tracking the exchange rate between the original currency of a monetary union (e.g., the Euro of the European Union) and any newly created or reestablished currency that emerges as a result of the breakup of monetary union. Exemplary block 202 of FIG. 2 may be implemented to determine a base value of a breakout index. One or more various breakout indexes may be fixed at an arbitrary "base value" of 1.0 or any other arbitrary fixed value (e.g., 100.00, 1,000.00, etc.) to the extent that dissolution of monetary union has not yet occurred. As explained in more detail below, an index may be simply valued at that arbitrary number assigned or determined at block 202 if, for example, the breakout of a specific entity has not occurred.

Determining a base value (either at block 202 or any other method disclosed herein) may consider one or more factors; however, a specific base value is not required or mandated. In one embodiment, determining a base value may comprise receiving an electronic signal indicative of a user input indicating the base value. The user input may be received from any electronic device, including computer devices 116, 118, 120 and/or PDA 122. The electronic signal may be received through the Internet 126 and/or LAN 124. In certain embodiments, determining a base value may comprise retrieving, such as with a processor, such as processor 101, a computer-executable instructions from a computer-readable medium (including, for example, any database (see 102, 108) or module (see 104, 106, 110, 112, 134, 136) within exchange computer system 100 or any memory computers 116, 118, 120 and/or PDA 122 shown in FIG. 1. The computer-executable instructions may comprise the actual base value, yet in other embodiments, the instructions may include one or methods for calculating the base value. For example, in one embodiment, computer-executable instructions may, upon execution by a processor, determine a previously calculated base value relating to another currency for use as the base value of block 202. Further, although block 202 was shown towards the top of flowchart 200, those of ordinary skill in the art will appreciate that block 202, as well other process illustrated in the FIGS. herein may be performed in other than the recited order, and that one or more steps illustrated may be optional in accordance with aspects of the various embodiments.

Block 204 may be implemented to receive an indication whether an entity issued a breakout currency. For example, an electronic signal may indicate that an entity of a monetary union issued a breakout currency. Similar to block 202, the electronic signal may be (but is not required to be) generated by a user input and received through an electronic communication channel, such as LAN 124 and/or Internet 126 or retrieved from one or more computer-readable mediums. In certain embodiments, the indication may merely indicate that a governmental entity's relationship with a monetary union may be altered such that the governmental entity issues a currency ("breakout currency)" separate from the currency of the monetary union. In other embodiments, a presumption that a breakout currency has issued or will issue may occur as a result of receiving related information.

As one example, the European Union's current currency is the Euro, therefore, any currency issued by a member of the European Union, would be considered a breakout currency as set forth in this disclosure. Breakout currencies include possible recreations of former currencies, such as for example, Portuguese escudo (PTE), Irish punt (IEP), Greek drachma (GRD) or Spanish peseta (ESP). Yet, in other embodiments the breakout currency may be a new currency. Further, those skilled in the art will appreciate that a portion or faction of a member of a monetary union may separate from the monetary union separate from another portion or faction and still be within the scope of this disclosure.

If at block 204 it is determined that a first breakout currency was not issued, then block 206 or another method may be implemented. In one embodiment, block 206 may calculate an initial index value of a prospective breakout index based upon a prospective breakout currency. Calculating a prospective breakout currency may be performed according to various methods. In accordance with one embodiment, an index value of an index based upon the currency of the monetary union may be received (see, block 206a). For example, if the prospective breakout currency relates to an entity of the European Union, then the value of the Euro (or an index based thereon) may be received. In certain embodiments, information regarding the value of the currency and/or and index based thereon may be received and/or stored at market data module 112 or any other module or computer-readable medium. Because the prospective breakout currency has yet to be issued (and may not issue), its value is related to the value of the currency of the monetary union (and/or an index based upon such a currency). Those skilled in the art with the benefit of reading this disclosure will appreciate that reference to a "first breakout currency" is for illustrative purposes only and that another breakout currency may issue before issuance of the first breakout currency. In this regard, the teachings of this disclosure are applicable to multiple indexes of several breakout currencies. Further, one or more indexes for breakout currencies may be based upon a currency of single monetary union.

Block 206b may be implemented to calculate an initial index value of the prospective breakout index. In one embodiment, a fixed base value (for example, a base value determined or received at block 202) may be combined with the index value received at block 206a. Thus, if the index relates to the exchange rate of the prospective breakout currency and the currency of the monetary union, the initial index value of the prospective breakout index will not vary from the base value. The calculation of the initial index value may be performed by any processor, including processor 101 of exchange computer system 100. The calculation may be performed on a routine basis, such as every hour, every day, and/or every week. Yet, in other embodiments, the calculation may be contingent on another action, for example, such as the receipt of an electronic signal.

If, however, the indication of block 204 indicates an issuance of the first breakout currency, an initial index value of a breakout index based upon the breakout currency may be calculated (see, block 208). In one embodiment, an initial exchange rate of the breakout currency against the currency of the monetary union may be received (see, block 208a). The initial exchange rate may be the first exchange rate obtained, yet in other embodiments, a determination may be made of when the currency issued and a currency exchange rate from the closest corresponding time frame may be utilized. Those skilled in the art will readily appreciate that the exchange rate may be gathered from numerous sources. For example, exchange rates may be received from prevailing prices in the marketplace, reference to an authoritative fixing such as a central bank, an official exchange rate, and/or obtained from survey data. Therefore, in accordance with certain embodiments, an exchange rate may be determined from information from a plurality of sources.

For example, instead of receiving an exchange rate from a first source, two or more values representing the exchange rate may be received from multiple sources. In one embodiment, the values may be averaged to obtain the exchange rate utilized. For example, survey data may be combined with an official exchange rate to obtain the exchange rate utilized. Those skilled in the art will readily appreciate that other methods for receiving an exchange rate may be implemented without departing from the scope of this disclosure.

An initial value of the first breakout currency may be determined at block 208b. In one embodiment, the initial value of the first breakout currency is determined as the reciprocal of the initial exchange rate received at block 208a. For example, the breakout currency index may be calibrated by establishing a "breakout value" that represents the reciprocal of the quoted exchange rate of the breakout currency vs. the currency of the monetary union, such as the Euro. Calculating the initial value, such as determining the reciprocal of the exchange rate, may be readily performed by any modern processor, such as processor, including for example, processor 101.

Block 208c may be implemented in calculating the initial index value of the breakout index. In certain embodiments, the initial index value is calculated upon receiving an indication that a breakout currency has issued. In other embodiments, the initial index value may be calculated upon receiving an indication that an entity (such as a governmental entity) has decided to alter its relationship with a monetary union such that a currency must be issued. Depending on the embodiments, either or both of these dates may be considered the "breakout date," thus signaling the date the initial index value was calculated. Block 208c may include combining a fixed base value (such as the base value of block 202) with the initial exchange rate of the breakout currency (such as received at 208a) and the breakout value of the breakout currency (see, block 208b). For example, Equation #1 may be implemented to calculate the initial index value of the breakout index.

$$\text{Breakout Index}_i = \text{Base Value} \times \text{Exchange Rate}_i \times \text{Breakout Value} \quad \text{Equation \#1:}$$

Thus, in accordance with the embodiment utilizing Equation #1, the initial value of the Breakout Index ("Breakout Index$_i$") equals the fixed base value ("Base Value") multiplied with the initial exchange rate ("Exchange Rate$_i$") and the breakout value determined as the reciprocal of the Exchange Rate$_i$ ("Breakout Value"). Therefore, the Breakout Index$_i$=Base Value.

Those persons of ordinary skill in the art will readily appreciate that exchange rates of currencies fluctuate, therefore, aspects of this disclosure relate to calculating updated values of the breakout index. Therefore, a second index value may be calculated for the breakout index at a second time frame that follows the time frame at which the initial value of the breakout index was determined (see, block 210). The calculation of the second index value (and/or any number of reiterations of calculating the index value) may be performed on a routine basis. Yet in other embodiments, occurrence of one or more events may trigger a calculation of a value for the breakout index. In certain embodiments, an updated exchange rate of the breakout currency against the monetary union currency may be obtained (see, block 210a, receiving a "second" exchange rate).

Further, calculating a second index value may utilize information obtained from or utilized in the calculation of the initial index value (e.g., block 208). For example, the initial value of the breakout currency calculated (or received) in block 208b may be utilized at block 210b or as part of any methods that may be implemented to receive the initial value of the breakout currency. In certain embodiments, this information may be combined with other information, for example the base value of the index (see, block 202) may be utilized to calculate the second index value of the breakout currency index. In one embodiment, a second value of the breakout index may be calculated using Equation #2, which is shown below.

$$\text{Breakout Index}_2 = \text{Base Value} \times \text{Exchange Rate}_2 \times \text{Breakout Value} \qquad \text{Equation \#2:}$$

As shown in Equation #2, the second value of the Breakout Index ("Breakout Index$_2$") equals the fixed base value of Equation #1 ("Base Value") multiplied with the second exchange rate ("Exchange Rate$_2$") and the breakout value of Equation #1 ("Breakout Value"). Therefore, unless the second exchange rate is identical to the initial exchange rate, then Breakout Index$_2$ will not equal the Base Value. An illustrative example of calculating an initial value and a second value of a Breakout Index according to Equations 1 and 2 is provided below.

In a hypothetical example, assume Greece separated from the European Union and reestablished the Greek Drachma as currency. In this example, the Greek drachma Breakup Index was associated with a fixed base value of 1,000.00 and the exchange rate on the breakout date equals 2.5000 drachmas per Euro. Therefore, using Equation #1: Breakout Index$_i$=Base Value (1,000)×Exchange Rate, (2.5)×Breakout Value (1/2.5=0.4).

As indicated above, using Equation #1 will calibrate the index on the breakout date such that Breakout Index$_i$=Base Value because the initial exchange rate ("Exchange Rate$_i$") cancels out the breakout value ("Breakout Value") which is the reciprocal of the Exchange Rate$_i$. Therefore, the Breakout Index$_i$=Base Value, which is 1,000.00.

Assume then at a second time frame the exchange rate fluctuates to 2.6000 such that it requires 2.6000 drachmas to purchase one Euro, therefore the second exchange rate ("Exchange Rate$_2$")=2.6. Thus, using Equation 2: Breakout Index$_2$=Base Value (1,000)×Exchange Rate$_2$(2.6)×Breakout Value (0.4). Therefore, using Equation #2, the second value of the Breakout Index ("Breakout Index$_2$") is 1040.00. Because the second exchange rate is no longer the same as the initial exchange rate, then Breakout Index$_2$ no longer equals the Base Value. Alternatively, if the second (or third) exchange rate fluctuates to 2.3500 drachmas per Euro, the Breakout Index value would be 940.00 (Breakout Index$_2$=Base Value (1,000)×Exchange Rate$_2$(2.35)×Breakout Value (0.4)=940.00.

Further embodiments are directed toward calculating a value for a breakout index only upon receiving an indication that a breakout currency will be or has issued. (see, block 302 of FIG. 3). For example, an index based upon a prospective breakout index may not be formed, but rather only an index based upon an actual breakout currency may be formed. In certain embodiments, an indication (such as part of block 302) indicates that a breakout currency has issued. In other embodiments, an indication may comprise information that an entity (such as a governmental entity) has decided to alter its relationship with a monetary union such that a currency will be issued. Depending on the embodiments, either or both of these dates may be considered the "breakout date," thus signaling the date the initial index value was calculated.

Block 304 may be implemented to receive a fixed base value of the breakout index. The reception of the fixed base value of block 304 may be the same as or similar to the reception of the base value of block 202. While a breakout index value may not be calculated until after formation of the particular breakout currency, the base value of block 304 may be determined or otherwise known before the formation of the breakout currency.

An initial exchange rate of the breakout currency against the currency of the monetary union may be received (see, block 306). The reception and/or determination of the initial exchange rate may be the same as or identical to one or more processes described above in relation to block 208a. An initial value of the first breakout currency of the breakout entity may be determined at block 308, which may be the same as or similar to the reception and/or determination of the initial value of the breakout currency described in relation 208b. Further, as shown in FIG. 3, block 310 may be implemented in the calculation of the initial index value of the breakout index. In certain embodiments, the initial index value is calculated upon receiving an indication that a breakout currency has issued. In other embodiments, the initial index value may be calculated upon receiving an indication that an entity (such as a governmental entity) has decided to alter its relationship with a monetary union such that a currency must be issued. Depending on the embodiments, either or both of these dates may be considered the "breakout date," thus signaling the date the initial index value was calculated.

Similar to block 208c of FIG. 2, block 310 may include combining a fixed base value (such as the base value of block 304) with the initial exchange rate of the breakout currency (such as received at 306) and the breakout value of the breakout currency (see, block 308). For example, Equation #1, discussed above, may be implemented to calculate the initial index value of the breakout index. Furthermore, a second index value may be calculated for the breakout index at a second time period that follows the time at which the initial value of the breakout index was determined (see, block 312). Block 312, or any other process(es) that calculate additional index values of the index may incorporate teachings disclosed earlier in this disclosure, including but not limited to: blocks 210a-210c. The calculation of the second index value (and/or any number of reiterations of calculating the index value) may be performed on a routine basis. Yet in other embodiments, occurrence of one or more events may trigger a calculation of a value for the breakout index. For example, if the initial value of the breakout index was calculated using Equation #1, then one embodiment may calculate a second value of the breakout index using Equation #2 (shown above).

The methods shown in FIGS. 2 and 3 may be used to determine the value of financial instruments in the form of futures and/or options on futures contracts. In one embodiment, the calculation of the value of the futures and/or options on futures contracts may be performed by an exchange, such as the Chicago Mercantile Exchange, Inc. The exchange may also perform other functions such as listing the financial instruments for trading, receiving bids and offers for the financial instruments and matching bids and offers for the financial instruments, for example using one or more components of exchange computer system 100, shown in FIG. 1. Conventional settlement services for executed trades of the financial instrument may also be performed by the exchange. The exchange may also provide notice of matched trades to traders associated with matched bids and offers.

Table 1. shown below, provides an exemplary futures specification of an exemplary breakout index.

| European Union Breakout Index Futures Specifications | |
|---|---|
| Subjects of Index | Possible "breakout currencies" from Portugal, Ireland, Greece and Spain vs. Euro |
| Contract Size | $50 × Breakout Index, e.g., if Breakout Index = 1,040.00 then futures contract value = $52,000 (=$50 × 1,040.00) |
| Tick Size | 0.01 index points ($5.00) |
| Index Construction | Breakout Index valued as follows. Breakup Index = 2,000.00 × Exchange Rate × Breakout Value The Exchange Rate represents the prevailing value of the subject breakout currency vs. the Euro quoted in terms of the breakout currency per one (1) Euro. The breakout value is fixed as reciprocal of exchange rate on breakout date (first business date on which breakout currency officially exists). Breakout value is established by survey of interbank FX dealers conducted at 9:00 am (CT). |
| Trade Ends @ | 9:16 am (CT) on $2^{nd}$ business day immediately preceding $3^{rd}$ Wednesday of contract month |
| Cash Settlement | All open positions on termination of trading are cash settled based upon special quotation of Breakout Index. This special quotation is based on exchange rate as established by survey conducted of interbank FX dealers by Exchange staff. Surveyed exchange rate is entered into Breakout Index formula as described above. |
| Trading Hours | Sundays through Fridays: 5:00 p.m.-4:00 p.m. Central time (CT) the next day. On Friday CME Globex ® platform closes at 4:00 p.m. and reopens Sunday at 5:00 p.m. CT. |
| Months | List three (3) years out in the months of June and December |
| Position Accountability | Positions of more than 6,000 contracts net long or short, in all contract months combined must provide, in a timely fashion upon request by CME, information regarding the position |

Orders regarding instruments of a breakout currency index may include a trader's name, trading firm name, account number, contract, price and quantity. Additional order information may include identifying information that uniquely identifies the order, such as a serial number, contract price and quantity.

Further aspects relate to systems and methods configured to calculate a value representing a prospective currency unit of a monetary union. For example, as discussed above, one or more entities may leave or be removed from a monetary union. In certain instances, the entities (referred to as a "breakout entities") may initiate circulating their own currency; therefore, the value of the currency of a monetary union will not reflect the economic conditions of the breakout entities. Therefore, aspects relate to calculating values for a prospective currency unit. For example, it may be beneficial to value a prospective currency of the monetary union to indicate a value as if the breakout entities were still part of the monetary union.

Figure 4:
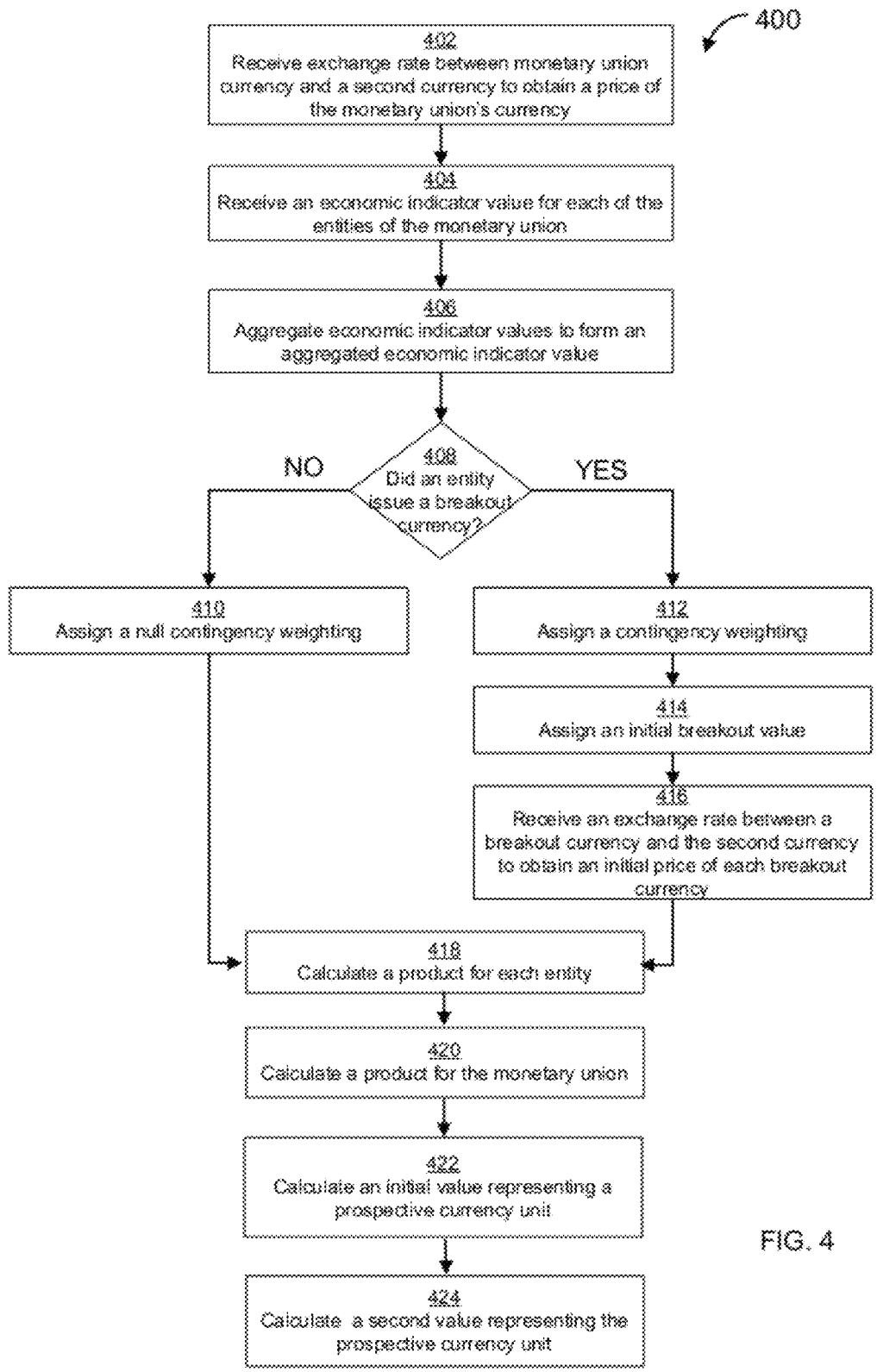
FIG. 4 is a flowchart showing an exemplary method of calculating prospective currency unit values in accordance with an embodiment of the invention.

FIG. 4 is flowchart 400 showing an exemplary method of calculating an exemplary prospective currency unit in accordance with one embodiment. The flowchart of FIG. 4 will be explained in association with FIGS. 5A-5C, which provide illustrative conceptual visualizations of tables showing the calculation of the prospective currency unit in accordance to exemplary embodiments. Therefore, FIG. 5A will first be discussed to provide a general overview.

As shown in FIG. 5A, table 500 shows a plurality of entities (see, e.g., the "States" listed in column 502) of a monetary union. As shown by column 504, the entities may be numerically represented, such as by the exemplary respective values shown in column 504. For example, the entity labeled "Austria" in column 502 is associated with, and therefore may be referenced by $_i$=1, and similarly the entity labeled "Greece" in column 502 may be referenced by $_i$=7.

Now turning to the exemplary method shown by flowchart 400, an exchange rate between a currency of the monetary union and a second currency may be received to obtain a price of the currency of the monetary union (see, block 402). For example, in one embodiment, if the monetary union is the European Union, then the exchange rate may be the rate of USD to the Euro. Those skilled in the art will readily appreciate that the exchange rate may be gathered from numerous sources. For example, exchange rates may be received from prevailing prices in the marketplace, reference to an authoritative fixing such as a central bank, an official exchange rate, survey data, or combinations thereof.

Block 404 and/or other process(es) may be implemented to receive an economic indicator value for each of the entities of the monetary union (or were previously as of a fixed timeframe, part of the monetary union). In one embodiment, the economic indicator value may comprise information relating to the gross domestic product ("GDP") of the individual entity. Estimates for the GDP may be obtained from a plurality of sources, including but not limited to: surveys, government agencies, commercial non-governmental entities, and combinations thereof Economic indicators may be transmitted though any electronic communication pathway, such as for example, either LAN 124 and/or Internet 126 shown in FIG. 1. One or more of the economic indicators may be received at exchange computer system 100.

Turning briefly to FIG. 5A, exemplary table 500 conceptually conveys one embodiment in which the economic indicator values relate to GDPs. The entities shown in table 500 are each associated with a GDP value (shown in column 506). The GDP value may be received at block 404. Those skilled in the art will appreciate that column 506 (or any column) is not required to be physically populated, but rather is shown for illustrative purposes to demonstrate the reception of data and calculation of one or more values based on one exemplary embodiment. Furthermore, while the GDP is conveyed in "Bil USD", those skilled in the art will appreciated that other currencies or units may be utilized and are within the scope of this disclosure.

Looking to row 508 of FIG. 5A, it relates to the monetary union (i.e., European Union or $_i$=0) whereas the collection of rows 510 provides information relating to individual entities within the monetary union at a specific time period ($_i$=1–16). In one embodiment, the time period may be just prior to at least one of the entities breaking out or otherwise changing its relationship with the monetary union. For example, table 500 may be viewed as a snapshot as what entities were within a specific monetary union on a specified date. Therefore, in one embodiment, a process (including, e.g., block 404) may be implemented to receive economic indicator values (e.g., shown in column 506) for each entity within the monetary union on a specific date (shown by collection of rows 510).

The economic indicators and/or any information derived from or relating to the indicators may be stored and/or manipulated with the utilization of any computer or portion thereof, including any modules shown as part of exchange computer system 100. For example, a non-transitory computer-readable medium may comprise computer-executable instructions, that when executed by a processor creates a data structure that logically associates the GDP data (and/or other economic indicator values) with the respective entities as shown in table 500 of FIG. 5. In accordance with one embodiment, processor 101 of computer exchange system 100 shown in FIG. 1 may execute the computer-executable instructions.

One or more processes, such as for example, block 406 of FIG. 4 may be implemented to aggregate the economic indicator values for the entities of the monetary union (i.e., the entities represented by the collection of rows 510) to form an aggregated economic indicator value. Those skilled in the art will realize that any processor, including a processor not related to computer exchange system 100 may be utilized to aggregate the economic indicators or perform other calculations utilizing the economic indicators. As shown in row 508, the sum of each of the economic indicator values for each of the entities in the collection of rows 510 is represented in column 506 of row 508 ("$10,584.611") which represents the GDP of the European Union.

Block 408 or other processes may be implemented to determine if one or more entities, such as one or more of the entities represented in the collection of rows 510, issues a breakout currency. For example, an electronic signal may be received that comprises information indicative that an entity of a monetary union issued a breakout currency. The electronic signal may be generated by a user input and received through an electronic communication channel, such as LAN 124 and/or Internet 126 or retrieved from one or more computer-readable mediums. In certain embodiments, the indication may merely indicate that a governmental entity's relationship with a monetary union may be altered such that the governmental entity issues a currency ("breakout currency)" separate from the currency of the monetary union. In other embodiments, a presumption that a breakout currency has issued or will issue may occur as a result of receiving related information from one or more sources. For example, the European Union's current currency is the Euro, therefore, any currency issued by a member (or faction thereof) of the European Union may be considered a breakout currency as set forth in this disclosure.

For one or more entities that did not issue a breakout currency (for example, as determined at block 408), a null contingency weighting may be assigned (see, e.g., block 410). Those skilled in the art will appreciate that assigning a null value may comprise an active method resulting in a value being populated in a table, such as table 500 of FIG. 5A. For example, column 512 shows an exemplary visual conception of an illustrative collection of contingent weightings ($W_i$, where i the corresponding value shown in column 504) in accordance with one embodiment. Looking to entry 514, which represents the possible contingency weights for "Greece" (see column 504, indicating "Greece" corresponds to $_i$=7), Greece may receive a null contingency value of "0%" or a second contingency value of "3.22%." Thus, for once embodiment, if Greece issues a breakout currency, then Greece's null contingency value may be "0." Therefore, according to the illustrated embodiment, $W_7$=0%. (The second possible contingency value will be discussed below in relation to block 412). Those skilled in the art will appreciate that other values, for example such as "0", "zero," "N/A", among others may designate a null value. Certain embodiments may be implemented such that an absence of a value is indicative of a null value; therefore, an empty value field or lack of any field may be indicative of a null value.

Alternatively, a contingency weighting may be assigned to one or more entities (see, e.g., block 412) that issued a breakout currency (for example, as determined at block 408). In one embodiment, the assigned contingency weighting may be a function of an economic indicator value (such as the economic indicator value received at block 404) of that particular entity. For example, looking again at the exemplary entity "Greece" of table 500, entry 514 indicates that Greece may receive a null contingency value of "0%" (as discussed above in relation to block 410) or a second contingency value of "3.22%." The second contingency value may be calculated by determining the proportion or attribution of Greece's economic indicator value to an aggregated economic value (such as the aggregated value of block 406). In the illustrated embodiment, the entry 516 shows that Greece's economic indicator value is "$341.000" billion USD and the aggregated value is "$10,584.611" (see column 506 of row 508). Therefore, in the illustrated example of table 500, Greece's economic indicator value is 3.22% of the aggregated value, therefore, in accordance with one embodiment, a contingency weighting reflecting the "3.22%" may be utilized ($W_7$=3.22%).

One or more systems or methods may assign an initial breakout value of the breakout currencies (see, e.g., block 414 of FIG. 4). In one embodiment, the assigned breakout value for a particular entity may represent the exchange rate of the breakout currency vs. the currency of the monetary union on the breakout date. As indicated above, the breakout date may be the date (or time frame within a date) that the breakout currency issued. In other embodiments, however, breakout date may be the date (or time frame within that date) in which an indication that the entity has decided to alter its relationship with a monetary union such that a currency must be issued.

In one embodiment, the breakout value may be determined in accordance with one or more methods and/or systems described above, including for example, blocks 208a and/208b of FIG. 2. For example, an initial exchange rate of the breakout currency against the currency of the monetary union may be received (see, block 208a). The initial exchange rate may be the first exchange rate obtained, yet in other embodiments, a determination may be made of when the currency issued and a currency exchange rate from the closest corresponding time frame may be utilized.

Those skilled in the art will readily appreciate that the exchange rate may be gathered from numerous sources. For example, exchange rates may be received from prevailing prices in the marketplace, reference to an authoritative fixing such as a central bank, an official exchange rate, and/or obtained from survey data. For example, instead of receiving an exchange rate from a first source, two or more values representing the exchange rate may be received from multiple sources. In one embodiment, the values may be averaged to obtain the exchange rate utilized. For example, survey data may be combined with an official exchange rate to obtain the exchange rate utilized. Those skilled in the art will readily appreciate that other methods for receiving an exchange rate may be implemented without departing from the scope of this disclosure.

A breakout value may be determined at block 414. In one embodiment, the initial value of the first breakout currency may be determined as the reciprocal of the initial exchange rate received at a method comprising or similar to block 208*a*. For example, the breakout value may represent the reciprocal of an exchange rate of the breakout currency vs. the currency of the monetary union, such as the Euro. Calculating the initial value, such as determining the reciprocal of the exchange rate, may be readily performed by any modern processor, such as processor, including for example, processor 101. For example, again assuming Greece issues a new drachma (GRD) as a breakout currency, implementing block 414 may reveal that 2.5000 GRD=1 Euro (EUR) on the breakout date, which may, for example, be the first official day of the existence of the new drachma. Therefore, in accordance with one embodiment, the breakout value may be fixed at $BV_7=2.5000$.

Further embodiments may be implemented to obtain an initial price of the currency of one or more breakout entities (see, e.g., block 416). Table 520 of FIG. 5B provides a conceptual illustration of an exemplary method of calculating an initial price of a breakout currency. Looking to row 522, entries in table 500 indicate that Greece has a contingency weighting of 3.22, thus $W_7=3.22\%$ (see, entry 524) and a breakout value of 2.5000, thus $BV_7=2.5000$ (see, entry 526). In one embodiment, the initial price of the breakout currency may be calculated as the exchange rate between the particular breakout currency and a second currency that is not the currency of the monetary union, however, may be derived from an exchange rate of the monetary union. For example, if the monetary union is the European Union (having the Euro as the currency), then an exchange rate may be calculated from the exchange rate of EURO/USD. For example, information obtained at block 402 may be utilized in the calculation or reception of the price of the breakout currency. For example, the implementation of block 402 may provide an indication that 1.3000 EUR=1 USD, therefore, the price of GRD may be established as the ratio of GRD/USD. For example, because $BV_7=2.5000$ indicates 2.5000 GRD=1 EUR, and 1.3000 EUR=1 USD, then there are 0.5200 USD/1 GRD. Therefore, the price calculated (or received) at block 416 or other methods to obtain the price of the breakout currency may be represented by $P_i$ (see, e.g., entry 528 of column 530 showing $P_7=0.5200$).

Certain embodiments may utilize a processor, such as processor 101 shown in FIG. 1, to execute computer-executable instructions on a computer-readable medium, that when execute perform a method of combining the price (e.g., $P_i$), contingency weighting (e.g., $W_i$), and the breakout value (e.g., $BV_i$), to calculate a product for each entity (see, e.g., block 418). In one embodiment, the product may be determined by multiplying the price, contingency weighting and breakout value for the breakout currency. For example, the computer-executable instructions may perform a method that executes Equation #3, which is provided below.

$$Product = P_i * W_i * BV_i \qquad \text{Equation \#3:}$$

For example, looking again to row 522 of table 520 of FIG. 5, using the values of obtained for Greece and applying equation #3, the product for Greece's breakout currency would be: $Product_7=P_7*W_7*BV_7$, therefore:

$$Product_7 = 0.5200 * 3.2\% * 2.5000 = 0.0419$$

Entry 529 of FIG. 5B, therefore may indicate that $Product_7=0.0419$. Looking to table 520, Greece is the only entity in the illustrated embodiment that issued a breakout currency. However, those skilled in the art will appreciate that additional entities may issue breakout currencies; therefore, products may be calculated for additional breakout entities.

Further embodiments are directed towards calculating the product of the monetary union from which the entity or entities are breaking away from (see, e.g., block 420). In one embodiment, the product for the monetary union may be calculated using equation #3: $Product_0=P_0*W_0*BV_0$. In this regard, the contingency weighting ($W_0$) of the monetary union may be determined according to the methods described above in relating to block 412. For example, the contingency value ($W_0$) may be calculated, at least in part, by determining the proportion or attribution of the monetary union's economic indicator value to an aggregated economic value (such as the aggregated value of block 406). Similarly, the contingency weight of the monetary union may also be determined by taking 100% of the aggregated value of block 406 and subtracting the sum of the contingency weights of the breakout entities. Applying such methods to the illustrated example of table 500 of FIG. 5A, would be $10,584.611−$341.000/10,584.611=96.78% (see also, entry 532 of FIG. 5 showing $W_0=96.8\%$). The breakout value of the monetary value ($BV_0$) may be fixed at 1.0 as its currency (the Euro) is the currency of the monetary union (see block 414). Simply put, the exchange rate of EUR/EUR=1.0. Therefore, entry 534 of FIG. 5B may be populated to indicate $BV_0=1.0$. In this regard, a breakout value may not be calculated in certain embodiments. The price of the monetary union may be received from block 402. For example, as discussed above, information received at block 402 may be implemented to receive an exchange rate between a currency of the monetary union and a second currency. For example, in one embodiment, if the monetary union is the European Union, then the exchange rate may be the rate of USD to the Euro. Using the above example in which 1.3000 EUR=1 USD, the price of the currency of the monetary union may be established as 1.3 (see, e.g., entry 536 showing $P_0=1.3000$).

Further embodiments may receive or calculate a value from all of the products for a plurality of breakout currencies. In one embodiment, block 422 may be implemented to sum the products (e.g., all of the products from each breakout entity and the product from the monetary union) to create an initial value representing a prospective currency unit of the monetary union. Certain embodiments may utilize a processor, such as processor 101 shown in FIG. 1, to execute computer-executable instructions on a computer-readable medium, that when execute perform a method of create an initial value of the prospective currency unit. For example, the computer-executable instructions may perform a method that executes Equation #4 which is provided below, shows an exemplary equation for calculating a prospective currency unity that may be referenced throughout this disclosure as the New European Currency Unit ("NECU"), as it applies to a prospective currency based upon the European Union, however, the name is merely for illustrative purposes.

$$NECU = \sum_{i=0}^{16} (P_i W_i BV_i) \quad \text{Equation \#4}$$

Therefore, applying Equation #4 to the illustrative embodiment shown in FIG. 5B, applying equation #3 would be essentially be: NECU=Product$_0$+Product$_7$ because the remaining products are zero ("0"). Therefore, on the initial breakout date, NECU=1.3 USD. Therefore, on the breakout date of the illustrative embodiment, the prospective currency ("NECU") equals the monetary union currency (the Euro) before the breakout currency issued.

Further aspects are directed towards creating a second value of the prospective currency unit (see, e.g., block 424 of FIG. 4). The calculation of a second value at a second time frame may be advantageous for several reasons. As one example, those skilled in the art with the benefit of this disclosure will appreciate that other entities (or portions thereof) may issue breakout currencies and/or exchange rates of one or more currency will fluctuate. The calculation of the second value (and/or any number of reiterations) may be performed on a routine basis. Yet in other embodiments, occurrence of one or more events may trigger a calculation of a value relating to the prospective currency unit.

In one embodiment, calculating a second value of the prospective currency unit may substantially incorporate and/or mimic methods utilized in the calculation of the initial value of the prospective currency unit. For example, FIG. 5C shows an updated table 522 at a second time period. One or more exchange rates may have fluctuated from the first time period, such as the breakout date of Greece represented by FIG. 5B. For example, FIG. 5C shows a time period after the breakout date in which the exchange rate for the Euro is 1.3500 EUR/1 USD (see entry 536 of FIG. 5C). Further, as seen by entry 528 of FIG. 5C, the exchange rate for the breakout currency of Greece (GRD) may have declined to 0.4400/1 USD. Therefore, an updated product may be calculated. In one embodiment, block 420 may be implemented to calculate the updated products, such as for example, utilizing a processor to execute computer-executable instructions on a tangible computer-readable medium that when executed, may perform a method that executes Equation #3. Therefore, the updated P$_i$ values (shown at entries 528 and 536 of FIG. 5C, respectively) may be multiplied with the updated W$_i$ values (shown at entries 524 and 532 of FIG. 5C, respectively) and the BV, previously obtained (shown at entries 526 and 534 of FIG. 5C, respectively). Further, the products may be summed together, for example, as described above in relation to block 522 to obtain the second value of the exemplary prospective currency unit. Therefore, as shown in FIG. 5C, the second value of the illustrated NECU currency unit may be calculated as 1.34195.

The methods shown in FIG. 4 and derivatives thereof may further be used to determine the value of financial instruments in the form of futures and/or options on futures contracts. In one embodiment, the calculation of the value of the futures and/or options on futures contracts may be performed by an exchange, such as the Chicago Mercantile Exchange, Inc. The exchange may also perform other functions such as listing the financial instruments for trading, receiving bids and offers for the financial instruments and matching bids and offers for the financial instruments, for example using one or more components of exchange computer system 100, shown in FIG. 1. Conventional settlement services for executed trades of the financial instrument may also be performed by the exchange. The exchange may also provide notice of matched trades to traders associated with matched bids and offers.

Further aspects of this disclosure are directed towards derivatives contracts including futures and over-the-counter (OTC) or interbank contracts which may be constructed based on a calculated value of a prospective currency, such as the NECU. These contracts may be financially or cash settled by reference to the value of the index on a specific date. Alternatively, they may call for the actual delivery of the NECU basket including the Euro and any breakout currencies. In certain implementations, one or more derivative contracts may be useful for managing the possible risks and consequences of a possible splintering of a monetary union, such as the European Union.

For purposes of illustration, a possible futures contract design is shown below as Table 2. As seen in Table 2, the Indexes are based possible breakout currencies from Portugal, Ireland, Greece and Spain and utilize a Base Value of 1,000.00. The futures contracts are cash settled to a value of $50×Breakout Index.

TABLE 1

NECU Futures Specifications

| | |
|---|---|
| Contract Size | 125,000 × Value of New European Currency Unit (NECU) as calculated by CME Group |
| Tick Size | 0.01 index points ($12.50) |
| Trade Ends @ | 9:16 am (CT) on 2$^{nd}$ business day immediately preceding 3$^{rd}$ Wednesday of contract month |
| Cash Settlement | All open positions on termination of trading are cash settled based upon special quotation of NECU. This special quotation is based on exchange rate as established by survey conducted of interbank FX dealers by Exchange staff. Surveyed exchange rates are entered into formula for calculation of the NECU |
| Trading Hours | Sundays through Fridays: 5:00 pm-4:00 pm Central time (CT) the next day. On Friday CME Globex ® platform closes at 4:00 pm and reopens Sunday at 5:00 pm CT. |
| Months | List three (3) years out in the months of June and December |
| Position Accountability | Positions of more than 6,000 contracts net long or short, in all contract months combined must provide, in a timely fashion upon request by CME, information regarding the position |

Orders regarding instruments of a prospective currency unit (or an index based upon a prospective currency unit) may include a trader's name, trading firm name, account number, contract, price and quantity. Additional order information may include identifying information that uniquely identifies the order, such as a serial number, contract price and quantity. The use of order information allows for the transmission of critical information between match engines while minimizing the consumption of bandwidth.

Aspects of the present invention have been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended exemplary aspects of the invention. All are considered within the sphere, spirit, and scope of the invention.

We claim:

1. A computer-implemented method of calculating an index value comprising:
   determining a fixed base value of a breakout index;
   receiving an indication whether an entity of a monetary union issues a first breakout currency; and
   wherein if the first breakout currency is not issued, calculating with a processor an initial index value of a prospective breakout index based upon a prospective breakout currency, the calculating comprising:
      receiving an index value of an index based upon a currency of the monetary union;
      combining the fixed base value of the breakout index with the index value based upon a currency of the monetary union to calculate the initial index value of the prospective breakout index;
   wherein if the first breakout currency is issued, upon its issuance, calculating with a processor an initial index value of a breakout index based upon the first breakout currency, the calculating comprising:
      receiving an initial exchange rate of the first breakout currency against a currency of the monetary union;
      determining a breakout value of the first breakout currency, wherein the breakout value is established as a reciprocal of the initial exchange rate; and
      combining the fixed base value of the breakout index such that the initial index value of the breakout index is equal to the fixed base value; and
      receiving bids for a breakout financial instrument based upon at least one of the breakout index or the prospective breakout index.

2. The computer-implemented method of claim 1, further comprising:
   calculating with a processor a second index value of the breakout index, the calculating comprising:
   receiving a second exchange rate of the first breakout financial instrument against the currency of the monetary union; and
   combining the fixed base value, the second exchange rate of the first breakout financial instrument, and the breakout value to create the second index value of the breakout index.

3. The computer-implemented method of claim 2, further comprising:
   receiving bids and offers for a breakout financial instrument based upon the breakout index; and
   matching bids and offers for the breakout financial instrument.

4. The computer-implemented method of claim 3, wherein the bids and offers are received at an order book module of the exchange computer system and are matched at a match engine of the exchange computer system.

5. The computer-implemented method of claim 2, wherein the currency of the monetary union is the Euro.

6. The computer-implemented method of claim 2, wherein the currency of the monetary union comprises the Euro or a derivative thereof.

7. The computer-implemented method of claim 2, wherein the first breakout currency is a previously existing currency.

8. The computer-implemented method of claim 2, wherein the fixed base value, the second exchange rate of the first breakout financial instrument, and the breakout value are multiplied against each other to create the second index value of the breakout index.

9. A non-transitory computer-readable medium having computer-executable instructions that when executed by a processor, perform at least:
   determining a fixed base value of a breakout index;
   receiving an indication whether an entity of a monetary union issues a first breakout currency; and
   wherein if the first breakout currency is not issued, calculating with a processor an initial index value of a prospective breakout index based upon a prospective breakout currency, the calculating comprising:
      receiving an index value of an index based upon a currency of the monetary union; and
      combining the fixed base value of the breakout index with the index value based upon a currency of the monetary union to calculate the initial index value of the prospective breakout index;
   wherein if the first breakout currency is issued, upon its issuance, calculating with a processor an initial index value of a breakout index based upon the first breakout currency, the calculating comprising:
      receiving an initial exchange rate of the first breakout currency against a currency of the monetary union;
      determining a breakout value of the first breakout currency, wherein the breakout value is established as a reciprocal of the initial exchange rate; and
      combining the fixed base value of the breakout index such that the initial index value of the breakout index is equal to the fixed base value; and
      receiving bids for a breakout financial instrument based upon at least one of the breakout index or the prospective breakout index.

10. The non-transitory computer-readable medium of claim 9, further comprising computer-executable instructions that when executed by a processor, perform at least:
   calculating with a processor a second index value of the breakout index, the calculating comprising:
   receiving a second exchange rate of the first breakout financial instrument against the currency of the monetary union; and
   combining the fixed base value, the second exchange rate of the first breakout financial instrument, and the breakout value to create the second index value of the breakout index.

11. The non-transitory computer-readable medium of claim 10, further comprising computer-executable instructions that when executed by a processor, perform at least:
   receiving bids and offers for a breakout financial instrument based upon the breakout index; and
   matching bids and offers for the breakout financial instrument.

12. The non-transitory computer-readable medium of claim 11, wherein the bids and offers are received at an order book module of the exchange computer system and are matched at a match engine of the exchange computer system.

13. The non-transitory computer-readable medium of claim 12, wherein the currency of the monetary union is the Euro.

14. The non-transitory computer-readable medium of claim 10, wherein the currency of the monetary union comprises the Euro or a derivative thereof.

15. The non-transitory computer-readable medium of claim 10, wherein the first breakout currency is a previously existing currency.

16. The non-transitory computer-readable medium of claim 10, wherein the fixed base value, the second exchange rate of the first breakout financial instrument, and the breakout value are multiplied against each other to create the second index value of the breakout index.

* * * * *